US010269355B2

(12) United States Patent
Miyamori et al.

(10) Patent No.: US 10,269,355 B2
(45) Date of Patent: Apr. 23, 2019

(54) DATA PROCESSING DEVICE, DATA PROCESSING METHOD, AND COMPUTER PROGRAM PRODUCT

(71) Applicant: KABUSHIKI KAISHA TOSHIBA, Tokyo (JP)

(72) Inventors: Shoko Miyamori, Kanagawa (JP); Takashi Masuko, Kanagawa (JP); Mitsuyoshi Tachimori, Kanagawa (JP); Kouji Ueno, Tokyo (JP); Manabu Nagao, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 69 days.

(21) Appl. No.: 15/070,874

(22) Filed: Mar. 15, 2016

(65) Prior Publication Data

US 2016/0274947 A1 Sep. 22, 2016

(30) Foreign Application Priority Data

Mar. 18, 2015 (JP) .................................. 2015-055258

(51) Int. Cl.
*G10L 15/34* (2013.01)
(52) U.S. Cl.
CPC .................................... *G10L 15/34* (2013.01)
(58) Field of Classification Search
None
See application file for complete search history.

(56) References Cited

U.S. PATENT DOCUMENTS

2014/0142929 A1* 5/2014 Seide ...................... G06N 3/08
704/202
2015/0340032 A1* 11/2015 Gruenstein ............. G10L 15/16
704/232

(Continued)

FOREIGN PATENT DOCUMENTS

JP 05-081163 A 4/1993
JP 11-250021 A 9/1999

(Continued)

OTHER PUBLICATIONS

Zhang et al., "Task Scheduling for GPU Heterogeneous Cluster", *IEEE International Conference on Cluster Computing Workshops*, pp. 161-169, 2012.

*Primary Examiner* — Sisley N Kim
(74) *Attorney, Agent, or Firm* — Foley & Lardner (57) ABSTRACT

According to an embodiment, a data processing device generates result data which represents a result of performing predetermined processing on series data. The device includes an upper-level processor and a lower-level processor. The upper-level processor attaches order information to data blocks constituting the series data. The lower-level processor performs lower-level processing on the data blocks having the order information attached thereto, and attaches common order information, which is in common with the data blocks, to values obtained as a result of the lower-level processing. The upper-level processor integrates the values, which have the common order information attached thereto, based on the common order information and performs upper-level processing to generate the result data.

11 Claims, 8 Drawing Sheets

(56) References Cited

U.S. PATENT DOCUMENTS

| | | | |
|---|---|---|---|
| 2016/0132233 A1* | 5/2016 | Ghassabian | G06F 3/0237 |
| | | | 715/773 |
| 2017/0220929 A1* | 8/2017 | Rozen | G06N 3/08 |
| 2017/0221470 A1* | 8/2017 | Kayama | G10L 13/0335 |

FOREIGN PATENT DOCUMENTS

| | | |
|---|---|---|
| JP | 2001-142487 A | 5/2001 |
| JP | 2001-237883 A | 8/2001 |
| JP | 2006-146589 A | 6/2006 |
| JP | 2013-101204 A | 5/2013 |
| JP | 5469028 B2 | 4/2014 |

* cited by examiner

DATA PROCESSING DEVICE, DATA PROCESSING METHOD, AND COMPUTER PROGRAM PRODUCT

CROSS-REFERENCE TO RELATED APPLICATIONS

This application is based upon and claims the benefit of priority from Japanese Patent Application No. 2015-055258, filed on Mar. 18, 2015; the entire contents of which are incorporated herein by reference.

FIELD

Embodiments described herein relate generally to a data processing device, a data processing method, and a computer program product.

BACKGROUND

A technology is known in which the processing of a requested task is parallelized (decentralized) so as to speed up the processing and reduce the response time. However, regarding a task in which the processing depends on the order relation of data, that is, regarding a task in which the processing of a particular data piece requires the processing result of previous data pieces; it is not possible to decentralize that single task.

Examples of such a task include a voice recognition performed by a voice recognition device that includes a decoder and a score calculator. In the voice recognition device, a series of voice data (series data) is clipped into frames (of 10 ms, generally) representing processing units and the processing is performed with respect to the frames. During the processing, firstly, the score calculator obtains an audio/linguistic score (hereinafter, simply called a score) for each frame. Then, the decoder integrates the scores of the frames, which constitute a series of voice data, in the order of appearance and outputs the result indicating the highest integrated score with respect to the entire voice data as the eventual recognition result. In this way, in a task of obtaining a voice recognition result from a series of voice data, in order to obtain the integrated score up to a particular frame, the scores of the frames appearing before the particular frame are required.

In the field of voice recognition, there have been attempts in the past to parallelize the voice recognition performed for each utterance section detected from input data containing utterance sections and non-utterance sections (herein, voice data of each utterance section represents a series of voice data to be recognized), and to decentralize the internal processing of audio score calculation on a task-by-task basis. However, when a voice recognition, which is to be performed with respect to a series of voice data and in which the dependence relationship among the frames is critical to the result, is treated in entirety as a single task; then decentralization of the task itself is not performed, thereby limiting the enhancement in the processing speed.

In other tasks, such as in a character recognition and a gesture recognition, in which series data is treated as the target for processing, it becomes necessary to perform processing depending on the order relation of data in an identical manner to the voice recognition, thereby leading to identical issues. For that reason, there is a demand for building a mechanism that enables decentralized processing with respect to series data and enables achieving enhancement in the processing speed.

DETAILED DESCRIPTION

According to an embodiment, a data processing device generates result data which represents a result of performing predetermined processing on series data. The device includes an upper-level processor and a lower-level processor. The upper-level processor attaches order information to data blocks constituting the series data. The lower-level processor performs lower-level processing on the data blocks having the order information attached thereto, and attaches common order information, which is in common with the data blocks, to values obtained as a result of the lower-level processing. The upper-level processor integrates the values, which have the common order information attached thereto, based on the common order information and performs upper-level processing to generate the result data.

Various embodiments are described below in detail with reference to the accompanying drawings. A data processing device according to the embodiments generates result data, which represents the result of performing predetermined processing on series data. For example, the data processing device is configured as a voice recognition device (a voice recognition system) that receives voice data as series data and outputs a voice recognition result obtained with respect to the voice data as the result data.

In a voice recognition device, a series of voice data to be recognized (voice data of a single utterance section) is clipped into frames representing processing units in the device. Then, frame-by-frame scores are obtained and are integrated in the order of appearance of the frames; and the result having the highest integrated score with respect to the entire voice data is output as the eventual voice recognition result. Herein, regarding a score calculation for calculating the frame-by-frame scores and a decoding for integrating the frame-by-frame scores and obtaining the eventual voice recognition result, the optimum computing resources for implementing effective processing are different. That is, the score calculation is performed using a deep neural network (DNN). Hence, as the computing resources for implementing the score calculation, the ideal scenario is to have hardware capable of performing the actual calculation at high speeds, such as general-purpose computing on graphics processing units (GPGPU). On the other hand, in the decoding, a large number of scores are integrated and the voice recognition result is calculated. Hence, as the computing resources for implementing the decoding, it is desirable to have hardware installed with a large-capacity random access memory (RAM).

In that regard, in the data processing device according to the embodiments, computing resources having different configurations are provided on an individual basis; and lower-level processing such as the score calculation is performed using the computing resources with the faster computing speed, while upper-level processing such as the decoding is performed using the computing resources with the greater memory capacity. The delivery of data between the lower-level processing and the upper-level processing is done using the interprocess communication (IPC) technology. Herein, the lower-level processing represents the processing for obtaining values required to generate result data, and the upper-level processing represents the processing for generating result data using the values obtained as a result of the lower-level processing. In the case in which the data processing device according to the embodiments is configured as a voice recognition device, the score calculation, which includes calculating frame-by-frame scores as values required to generate a voice recognition result representing the result data, represents the lower-level processing; while the decoding, which includes using the frame-by-frame scores obtained as values as a result of the lower-level processing and generating a voice recognition result, represents the upper-level processing. In the following explanation, in the data processing device according to the embodiments, the constituent element performing the lower-level processing is called a lower-level processor, and the constituent element performing the upper-level processing is called an upper-level processor.

In the data processing device according to the embodiments, a single task with respect to series data includes the lower-level processing, which can be implemented independent of the order relation of data, and the upper-level processing in which the order relation of data is important. In the example of configuring the data processing device as a voice recognition device, a single task includes a series of processing for generating, from a series of voice data to be recognized (voice data of a single utterance section), a voice recognition result (text data) of a single utterance. Herein, the score calculation (the lower-level processing), which includes calculating the frame-by-frame scores with respect to the voice data to be recognized, can be performed independent of the order relation of the frames. On the other hand, the decoding (the upper-level processing), which includes using the frame-by-frame scores and generating a voice recognition result, is dependent on the order relation of the frames.

In the data processing device according to the embodiments, a mechanism is provided that, with respect to a single task of the abovementioned type, enables parallelization (decentralization) of the lower-level processing that is implementable independent of the order relation of data, thereby enabling achieving enhancement in the processing speed of that single task. Thus, in the data processing device according to the embodiments, with respect to the series data to be processed in a single task (in the example of configuring the data processing device as a voice recognition device, voice data of a single utterance section), the upper-level processor attaches, to each data block constituting the series data and representing a processing unit (in the example of configuring the data processing device as a voice recognition device, to each frame), order information indicating the order of the data blocks in the series data, and then stores the data blocks in a first storage. The lower-level processor performs the lower-level processing on the data blocks stored in the first storage; attaches common order information, which is in common with the data blocks, to the obtained values (in the example of configuring the data processing device as a voice recognition device, frame-by-frame scores) and stores the values in a second storage. Then, the upper-level processor integrates the values, which are stored in the second storage, based on the order information and performs the upper-level processing.

In this way, in the data processing device according to the embodiments, the delivery (interprocess communication) of data between the upper-level processor and the lower-level processor is performed via buffers (the first storage and the second storage). At that time, order information indicating the order relation is attached to the data blocks constituting the series data to be processed in a single task and to the values obtained as a result of performing the lower-level processing on the data blocks. Hence, the upper-level processing that is dependent on the order relationship can be suitably performed while parallelizing the lower-level processing with respect to the data blocks. Thus, in the data processing device according to the embodiments, as a result of providing the mechanism explained above, it becomes possible to perform decentralization on the series data to be processed in a single task, thereby enabling achieving enhancement in the processing speed.

In the conventional interprocess communication, in the case of handling series data such as voice data for which the order relation is important, it is necessary to implement a protocol such as the transmission control protocol (TCP) in which the order relation of data is secured. In contrast, in the interprocess communication performed in the data processing device according to the embodiments, there is no such restriction.

Explained below in more detail are specific examples of the data processing device according to the embodiments under the premise that the data processing device is configured as a voice recognition device.

First Embodiment

Figure 1:
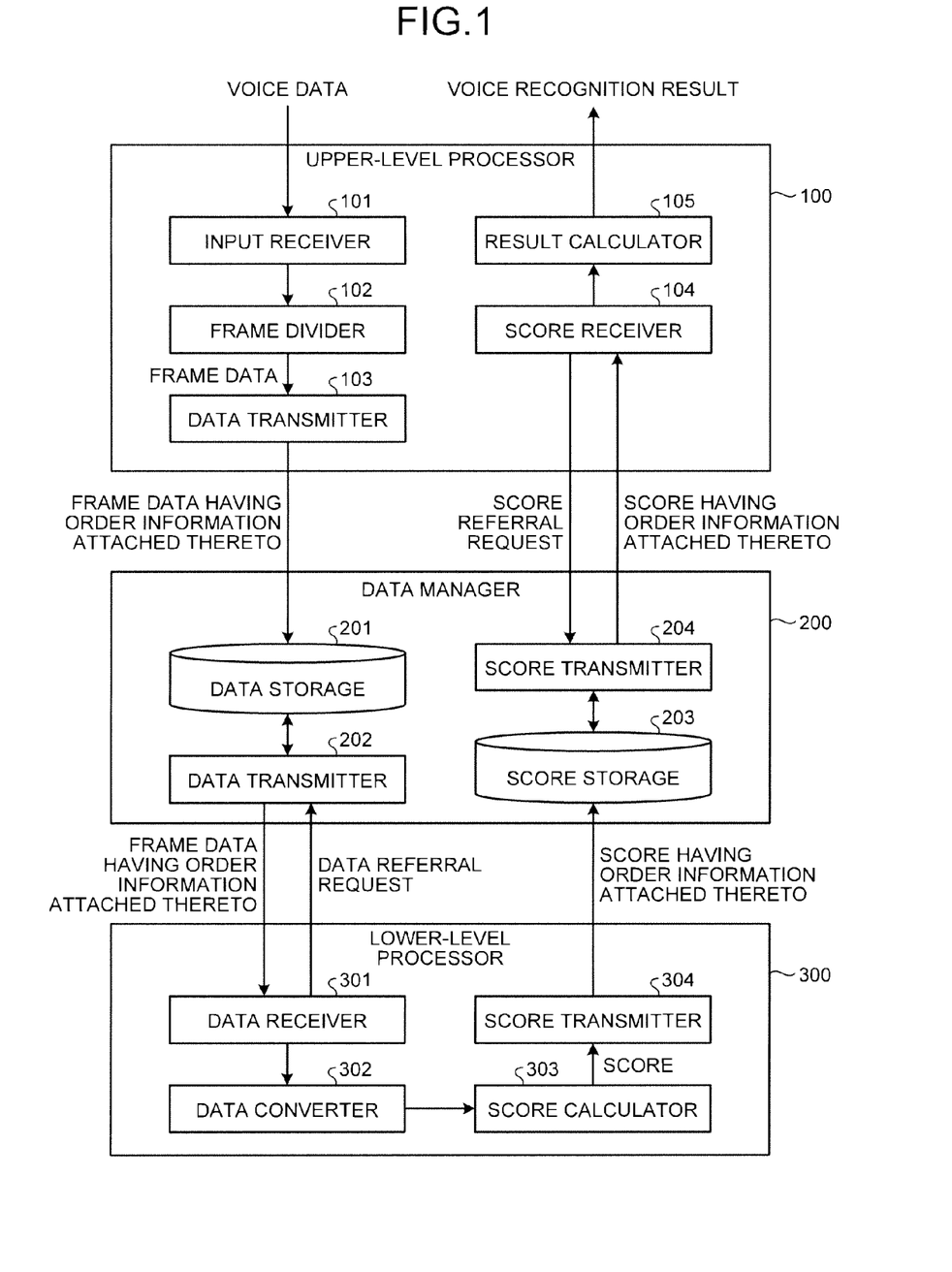
FIG. 1 is a block diagram illustrating an exemplary configuration of a data processing device according to a first embodiment.

FIG. 1 is a block diagram illustrating an exemplary configuration of a data processing device according to a first embodiment. As illustrated in FIG. 1, the data processing device according to a first embodiment includes an upper-level processor 100, a data manager 200, and a lower-level processor 300. The upper-level processor 100, the data manager 200, the lower-level processor 300 can be implemented using independent information processing devices (computers). Alternatively, some or all of those constituent elements can be implemented using a common information processing device (a common computer). In the case of implementing the upper-level processor 100 and the lower-level processor 300 using independent information processing devices, it is desirable that the upper-level processor 100 is implemented using the information processing device having the computing resources with the greater memory capacity and the lower-level processor 300 is implemented using an information processing device having computing resources with the faster computing speed. On the other hand, in the case of implementing the upper-level processor 100 and the lower-level processor 300 using a common information processing device, it is desirable that the information processing device has at least two computing resources with different configurations, and that the computing resource having the greater memory capacity is used to implement the upper-level processor 100 and the computing resource having the faster computing speed is used to implement the lower-level processor 300.

If the upper-level processor 100 and the data manager 200 are to be implemented using independent information processing devices as well as if the data manager 200 and the lower-level processor 300 are to be implemented using independent information processing devices, it is assumed that the information processing devices are connected using a communication line such as a local area network (LAN) or the Internet. On the other hand, if the upper-level processor 100 and the data manager 200 are to be implemented using a common information processing device as well as if the data manager 200 and the lower-level processor 300 are to be implemented using a common information processing device, it is assumed that the constituent elements are connected by a bus.

As illustrated in FIG. 1, the upper-level processor 100 includes an input receiver 101, a frame divider 102, a data transmitter 103 (an order information attacher), a score receiver 104, and a result calculator 105. The data manager 200 includes a data storage 201 (a first storage), a data transmitter 202, a score storage 203 (a second storage), and a score transmitter 204. The lower-level processor 300 includes a data receiver 301, a data converter 302, a score calculator 303, and a score transmitter 304. Given below is the explanation of the role of each constituent element.

Every time the data processing device according to the first embodiment executes a single task, the input receiver 101 of the upper-level processor 100 receives input of voice data (series data) to be processed during the task. As described earlier, in the data processing device according to the first embodiment, the voice data processed during a single task represents voice data of a single utterance section. When the data input to the data processing device contains utterance sections and non-utterance sections; for example, the upper-level processor 100 can detect the voice sections, and the input receiver 101 can receive the voice data for each detected utterance section as the voice data to be processed during a single task.

The frame divider 102 divides the voice data, which is received by the input receiver 101, into frames (data blocks) representing internal processing units of the device. Meanwhile, if the voice data received by the input receiver 101 is already divided into frames, then the operation of the frame divider 102 becomes redundant. Moreover, if the data in each divided frame (hereinafter, called frame data) represents speech waveform data, then the frame divider 102 can convert the speech waveform data into an audio feature quantity.

The data transmitter 103 attaches order information indicating the order of the frames in the voice data to be recognized to each piece of frame data obtained by the frame divider 102 by means of division, and then sends the frame data to the data manager 200. Upon being sent to the data manager 200, the frame data having the order information attached thereto is stored in the data storage 201. Herein, as long as the order information attached to each piece of frame data enables identification of the order, it serves the purpose.

Examples of the order information include continuous numerical values, discrete numerical values, alphabets, and character strings made of numerical values and alphabets.

Moreover, along with attaching the order information, the data transmitter 103 can further attach priority information indicating the priority of the frame to each piece of frame data that is obtained by means of division by the frame divider 102, and then send the frame data to the data manager 200. As a result of attaching the priority information, an application such as controlling the sequence of processing independent of the order becomes available. For example, if the data input to the data processing device according to the first embodiment contains a plurality of utterance sections and if a voice recognition of a plurality of tasks is to be performed on the plurality of voice sections detected from the data, then the voice data processed in a task positioned latter in the order has a smaller noise than the voice data processed in a task positioned earlier in the order. Thus, if the result can be sent back instantly, then the frames corresponding to the voice data to be processed in the latter tasks are set to have a high priority, thereby giving priority to the processing of latter tasks. That enables achieving reduction in the period of time until the first response is given. Meanwhile, for example, with respect to each frame of the voice data to be processed in a single task, if the period of time required for the lower-level processor 300 can be estimated, then the frames for which score calculation takes time are given priority and score calculation is started earlier for those frames. That enables achieving reduction in the total processing time for a single task.

In response to a data referral request issued by the lower-level processor 300, the data transmitter 202 of the data manager 200 checks whether or not frame data not processed in the lower-level processor 300 is stored in the data storage 201. If unprocessed frame data is stored in the data storage 201, then the data transmitter 202 reads the frame data from the data storage 201 and sends it to the lower-level processor 300. At that time, if a plurality of pieces of unprocessed frame data having the priority information attached thereto is stored in the data storage 201, then the data transmitter 202 reads the pieces of frame data according to the priority and sends them to the lower-level processor 300. Meanwhile, if the frame data stored in the data storage 201 does not have the priority information attached thereto, then the data transmitter 202 can be configured to sequentially read, from among a plurality of sets of frame data stored in the data storage 201, the frame data specified to be higher in the order in the order information and to send that frame data to the lower-level processor 300.

The data receiver 301 of the lower-level processor 300 issues a data referral request to the data manager 200, and receives unprocessed frame data sent in response by the data manager 200. As described earlier, the frame data received by the data receiver 301 has the order information attached thereto by the upper-level processor 100.

The data converter 302 converts the frame data, which is received by the data receiver 301, into data such as an audio feature quantity that is suitable for score calculation. If the frame data received by the data receiver 301 is already suitable for score calculation, that is, if the frame divider 102 of the upper-level processor 100 has converted the frame data from speech waveform data into an audio feature quantity; then the processing of the data converter 302 becomes redundant.

The score calculator 303 performs frame-by-frame score calculation using, for example, a deep neural network (DNN) based on the frame data obtained by conversion by the data converter 302 (or, if the conversion by the data converter 302 is not required, based on the frame data received by the data receiver 301). Generally, the frame-by-frame scores represents a set of a plurality of values calculated from the frame data (a score set). However, herein, the set is simply called scores. The frame-by-frame score calculation performed by the score calculator 303 is not dependent on the order relation of the frames. Hence, the score calculation for a plurality of frames can be performed in parallel.

The score transmitter 304 attaches the order information, which is in common with the frame data, to the frame-by-frame scores obtained as a result of score calculation performed by the score calculator 303, and then sends the scores to the data manager 200. Each score that has the order information attached thereto and that is sent to the data manager 200 is stored the score storage 203. As long as the order information, which is in common with the frame data, indicates the same order as the order information attached to the frame data by the upper-level processor 100, it serves the purpose. That is, the order information need not always be identical to the order information attached to the frame data. For example, information that is calculated based on the order information attached to the frame data can be attached to the scores.

In response to a score referral request issued by the upper-level processor 100, the score transmitter 204 of the data manager 200 checks whether or not the score of a frame that is not processed in the upper-level processor 100 is stored in the score storage 203. If the score of an unprocessed frame is stored in the score storage 203, then the score transmitter 204 reads that score from the score storage 203 and sends it the upper-level processor 100. At that time, if a plurality of scores of unprocessed frames is stored in the score storage 203; then the score transmitter 204 sequentially reads, from among a plurality of scores stored in the score storage 203, the scores specified to be higher in the order in the order information and sends them to the upper-level processor 100.

The score receiver 104 of the upper-level processor 100 issues a score referral request to the data manager 200, and receives the score of each unprocessed frame as sent in response by the data manager 200. As described earlier, each score received by the score receiver 104 is attached with the order information that is in common with the frame data.

The result calculator 105 integrates the scores of the frames, which are received by the score receiver 104, based on the order information attached to the scores. When the voice data received as input by the input receiver 101 is integrated, that is, when the scores of all frames included in the voice data of the single utterance section to be recognized are integrated; the result calculator 105 generates the result having the highest integrated score as the voice recognition result for the entire voice data, and outputs the result to an external application.

Given below is the explanation of an example of operations performed in the data processing device according to the first embodiment.

Figure 2:
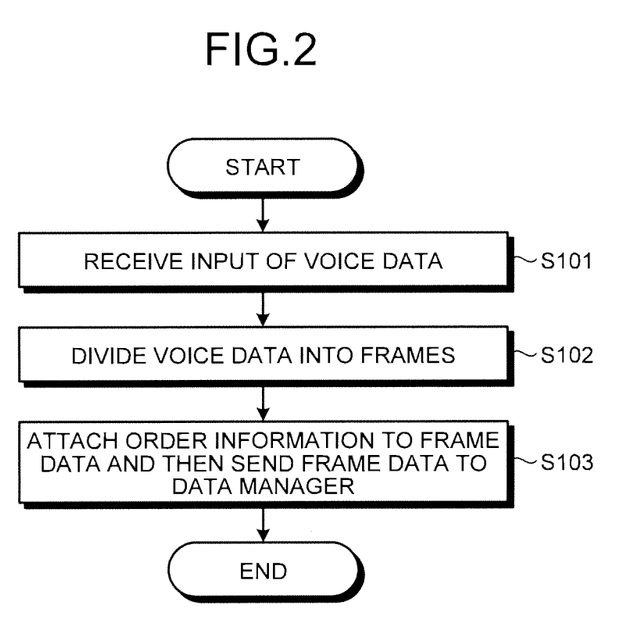
FIG. 2 is a flowchart for explaining an exemplary sequence of processing performed in an upper-level processor.

Firstly, explained with reference to FIG. 2 are the processing performed in the upper-level processor 100 starting from the input of voice data to be recognized up to the storage of frame data in the data storage 201. FIG. 2 is a flowchart for explaining an exemplary sequence of processing performed in the upper-level processor 100.

When voice data to be recognized is input to the upper-level processor 100, firstly, the input receiver 101 receives input of the voice data (Step S101). Then, the voice data received by the input receiver 101 is sent to the frame divider 102.

Subsequently, the frame divider 102 divides the voice data, which is received from the input receiver 101, into frames (Step S102). Each piece of frame data obtained by means of division by the frame divider 102 is sent to the data transmitter 103.

Then, the data transmitter 103 attaches the order information, which indicates the order of the frames in the voice data, to each piece of frame data sent by the frame divider 102, and then sends the frame data to the data manager 200 (Step S103). At that time, the data transmitter 103 can also attach the priority information, which indicates the priority of the frames, to the frame data, and then send the frame data to the data manager 200. The frame data sent by the data transmitter 103 to the data manager 200 is stored in the data storage 201.

Figure 3:
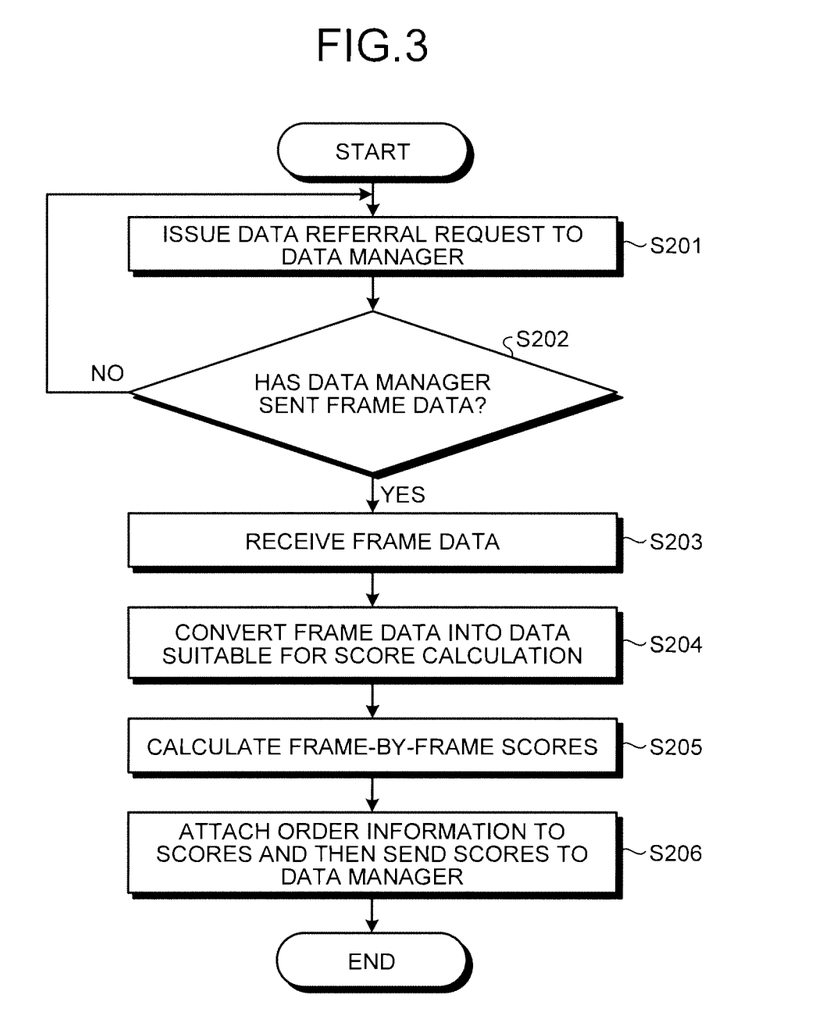
FIG. 3 is a flowchart for explaining an exemplary sequence of processing performed in a lower-level processor.

Explained below with reference to FIG. 3 are the processing performed in the lower-level processor 300. FIG. 3 is a flowchart for explaining an exemplary sequence of processing performed in the lower-level processor 300.

In the lower-level processor 300, firstly, the data receiver 301 issues a data referral request to the data manager 200 (Step S201). At that time, if frame data not processed in the lower-level processor 300 is stored in the data storage 201 of the data manager 200, then the data transmitter 202 of the data manager 200 sends the unprocessed frame data to the lower-level processor 300 as a response to the data referral request. Moreover, if a plurality of pieces of unprocessed frame data having the priority information attached thereto is stored in the data storage 201, the pieces of frame data are sequentially sent according to the priority.

After issuing a data referral request to the data manager 200, the data receiver 301 determines whether or not the data manager 200 has sent frame data in response to the data referral request (Step S202). If the data manager 200 has sent frame data (Yes at Step S202), the data receiver 301 receives that frame data (Step S203). Herein, the frame data received by the data receiver 301 is transferred to the data converter 302. Meanwhile, if the data manager 200 has not sent frame data (No at Step S202), then the system control returns to Step S201. Then, the data receiver reissues a data referral request, and the subsequent processing is repeated.

Subsequently, the data converter 302 converts the frame data, which is received from the data receiver 301, into data such as an audio feature quantity that is suitable for score calculation (Step S204). The frame data subjected to conversion by the data converter 302 is then sent to the score calculator 303. Meanwhile, if the frame data received by the data receiver 301 is already suitable for score calculation, then the operation at Step S204 is skipped.

Subsequently, the score calculator 303 calculates frame-by-frame scores based on the frame data sent by the data converter 302 (Step S205). The frame-by-frame score calculated by the score calculator 303 is sent to the score transmitter 304.

Then, the score transmitter 304 attaches common order information, which is in common with the frame data, to the frame-by-frame scores sent by the score calculator 303 and sends the scores to the data manager 200 (Step S206). The frame-by-frame scores sent from the score transmitter 304 to the data manager 200 are stored in the score storage 203.

Figure 4:
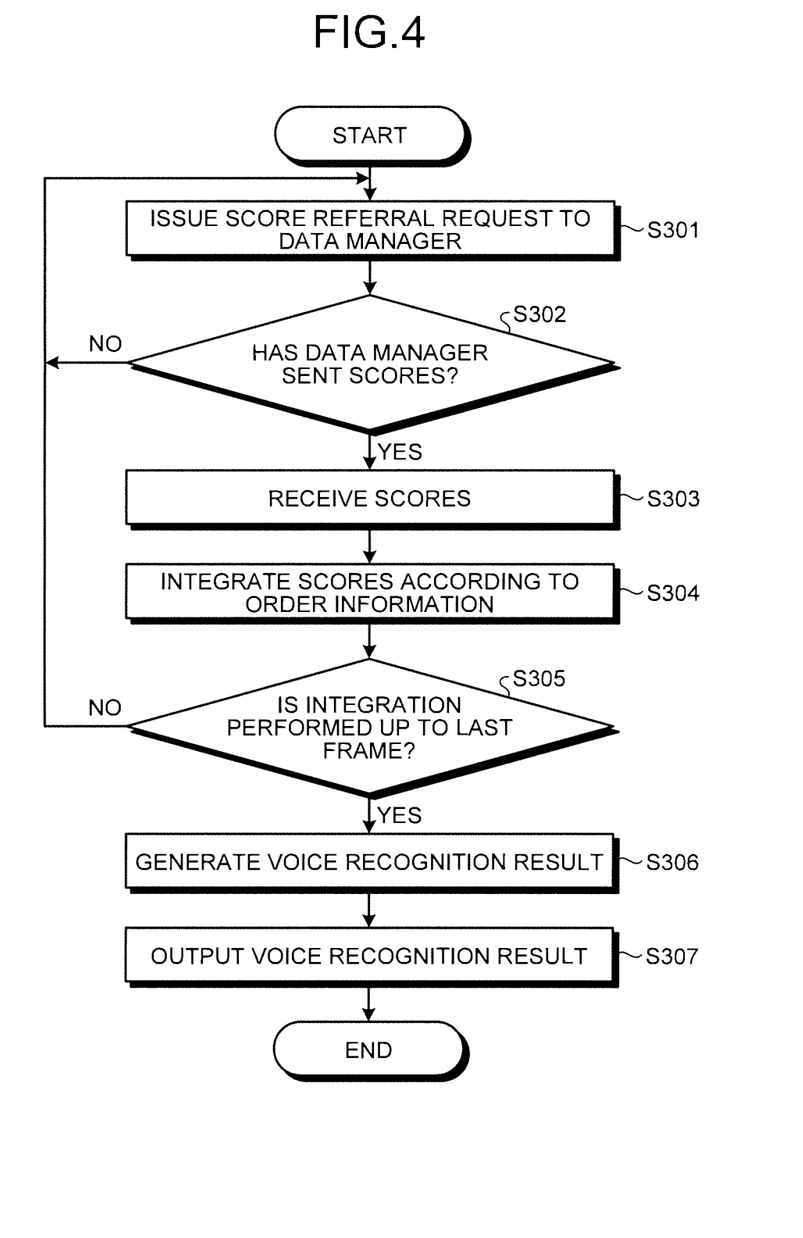
FIG. 4 is a flowchart for explaining an exemplary sequence of processing performed in the upper-level processor.

Explained below with reference to FIG. 4 are the processing performed in the upper-level processor 100, which makes use of the scores stored in the score storage 203 and generates a voice recognition result with respect to the voice data to be recognized. FIG. 4 is a flowchart for explaining an exemplary sequence of processing performed in the upper-level processor 100.

In the upper-level processor 100, firstly, the score receiver 104 issues a score referral request to the data manager 200 (Step S301). At that time, if a score not processed in the upper-level processor 100 is stored in the score storage 203 of the data manager 200, then the score transmitter 204 of the data manager 200 sends the unprocessed score to the upper-level processor 100 as a response to the score referral request. If a plurality of unprocessed scores is stored in the score storage 203, then the scores are sequentially sent from the scores specified to be higher in the order in the order information.

After issuing a score referral request to the data manager 200, the score receiver 104 determines whether or not the data manager 200 has sent a score in response to the score referral request (Step S302). If the data manager 200 has sent a score (Yes at Step S302), then the score receiver 104 receives that score (Step S303). The score received by the score receiver 104 is sent to the result calculator 105. On the other hand, if the data manager 200 has not sent a score (No at Step S302), the system control returns to Step S301. Then, the score receiver 104 reissues a score referral request, and the subsequent processing is repeated.

Subsequently, based on the order information attached to the scores of the frames as sent by the score receiver 104, the result calculator 105 integrates the scores in such a way that consistency is maintained with the order of the frames in the voice data to be recognized (Step S304).

Then, the result calculator 105 determines whether or not score integration is performed up to the last frame in the voice data to be recognized (Step S305). If score integration has not been performed up to the last frame (No at Step S305), the system control returns to Step S301. Then, the score receiver 104 reissues a score referral request, and the subsequent processing is repeated.

When score integration is performed up to the last frame in the voice data to be recognized (Yes at Step S305), the result calculator 105 generates the result having the highest integrated score up to the last frame as the voice recognition result with respect to the voice data to be recognized (Step S306). Then, the result calculator 105 outputs the generated voice recognition result to an external application (Step S307).

As explained above with reference to concrete examples, in the data processing device according to the first embodiment, the upper-level processor 100 attaches, to each frame in the voice data to be recognized, order information indicating the order of the frames in the voice data and then stores frame data in the data storage 201 of the data manager 200. The lower-level processor 300 calculates frame-by-frame scores based on the frame data stored in the data storage 201; attaches common order information, which is in common with the frame data, to the frame-by-frame scores; and stores the scores in the score storage 203 of the data manager 200. Then, the upper-level processor 100 integrates the frame-by-frame scores, which are stored in the score storage 203, based on the order information and generates a voice recognition result with respect to the voice data to be recognized. Hence, in the data processing device according to the first embodiment, in parallel to the frame-by-frame score calculation performed by the lower-level processor 300, the upper-level performing unit 100 can suitably generate the voice recognition result with respect to the entire voice data, thereby enabling achieving enhancement in the processing speed.

Second Embodiment

Given below is the explanation of a second embodiment. In the first embodiment, regarding the transfer of frame data from the data manager 200 to the lower-level processor 300 and regarding the transfer of scores from the data manager 200 to the upper-level processor 100, what is called a pull method is implemented in which the lower-level processor 300 and the upper-level processor 100 access the data manager 200 and obtain the frame data and the scores, respectively. In contrast, in the second embodiment, regarding the transfer of frame data from the data manager 200 to the lower-level processor 300 and regarding the transfer of scores from the data manager 200 to the upper-level processor 100, what is called a push method is implemented in which the data manager 200 autonomously sends the frame data and the scores. Given below is the explanation of only the differences with the first embodiment.

A data processing device according to the second embodiment has an identical configuration to the configuration of the data processing device according to the first embodiment (see FIG. 1). Hence, the detailed explanation is not repeated. However, in the second embodiment, the data receiver 301 of the lower-level processor 300 does not issue a data referral request to the data manager 200, and receives frame data that is autonomously sent by the data transmitter 202 of the data manager 200. Moreover, in the second embodiment, the score receiver 104 of the upper-level processor 100 does not issue a score referral request to the data manager 200, and receives the scores that are autonomously sent by the score transmitter 204 of the data manager 200.

In the second embodiment, the data transmitter 202 of the data manager 200 sends the frame data, which is stored in the data storage 201, to the lower-level processor 300 according to the priority specified in the priority information if the priority information is attached to the frame data. However, if the priority information is not attached to the frame data stored in the data storage 201, then the data transmitter 202 sequentially sends the frame data to the lower-level processor 300 in descending order of the order specified in the order information, for example. The lower-level processor 300 receives the frame data that is autonomously sent by the data transmitter 202 of the data manager 200, and performs frame-by-frame score calculation.

Moreover, in the second embodiment, the score transmitter 204 of the data manager 200 sequentially sends the frame-by-frame scores, which are stored in the score storage 203, in descending order of the order specified in the order information to the upper-level processor 100. Thus, the upper-level processor 100 receives the frame-by-frame scores that are autonomously sent by the score transmitter 204 of the data manager 200; integrates the received scores based on the order information; and generates a voice recognition result with respect to the entire voice data.

Figure 5:
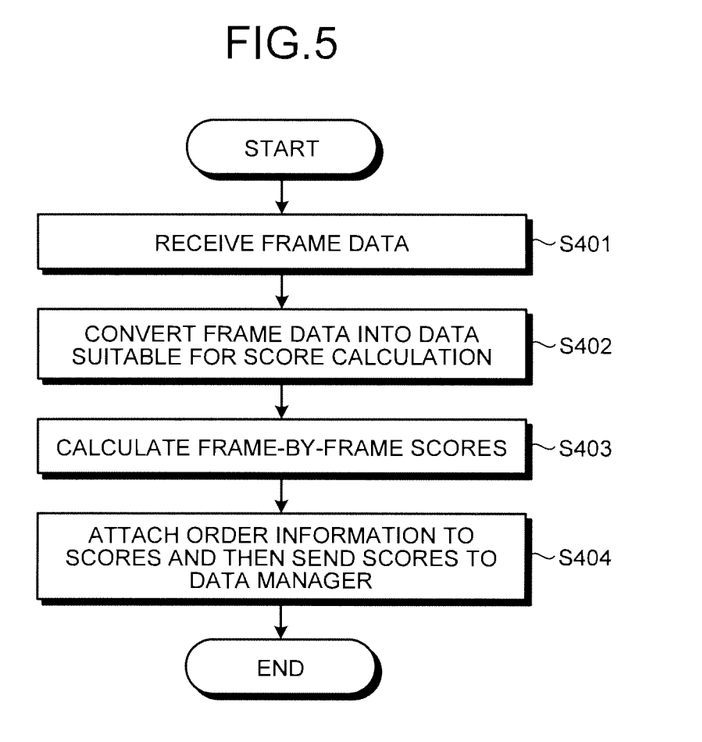
FIG. 5 is a flowchart for explaining an exemplary sequence of processing performed in the lower-level processor according to a second embodiment.

FIG. 5 is a flowchart for explaining an exemplary sequence of processing performed in the lower-level processor 300 according to the second embodiment. In the lower-level processor 300 according to the second embodiment, when frame data is sent by the data manager 200, the data receiver 301 receives the frame data (Step S401). Then, in an identical manner to the first embodiment, the data converter 302 performs data conversion (Step S402), the score calculator 303 performs frame-by-frame score calculation (Step S403), and the score transmitter 304 attaches the order information and sends the scores to the data manager 200 (Step S404).

Figure 6:
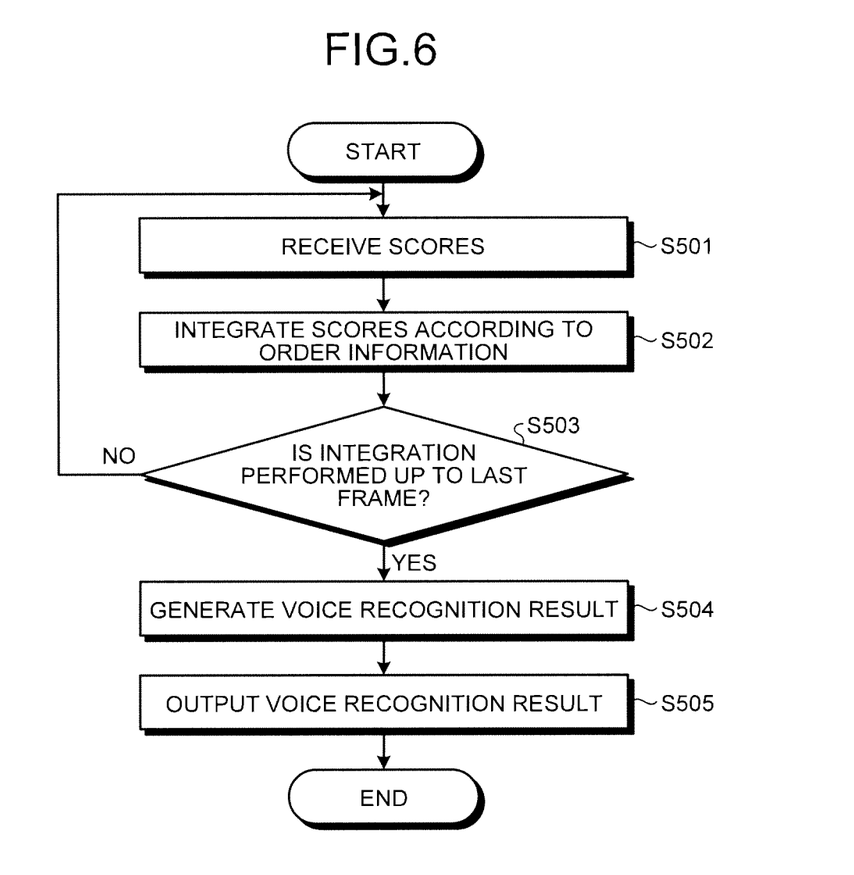
FIG. 6 is a flowchart for explaining an exemplary sequence of processing performed in the upper-level processor according to the second embodiment.

FIG. 6 is a flowchart for explaining an exemplary sequence of processing performed in the upper-level processor 100 according to the second embodiment. In the upper-level processor 100 according to the second embodiment, when the frame-by-frame scores are sent by the data manager 200, the score receiver 104 receives the scores (Step S501). Then, in an identical manner to the first embodiment, the result calculator 105 integrates the scores (Step S502), determines whether or not score integration is performed up to the last frame (Step S503), generates a voice recognition result based on the integrated score (Step S504), and outputs the voice recognition result (Step S505).

In the second embodiment too, in an identical manner to the first embodiment, the frame data, which is sent from the upper-level processor 100 to the lower-level processor 300 via the data manager 200, and the frame-by-frame scores, which are sent from the lower-level processor 300 to the upper-level processor 100 via the data manager 200, have the order information attached thereto that indicates the order of the frames in the voice data to be recognized. Thus, in the second embodiment too, in an identical manner to the first embodiment, in parallel to the frame-by-frame score calculation performed by the lower-level processor 300, the upper-level processor 100 can suitably generate the voice recognition result with respect to the entire voice data, thereby enabling achieving enhancement in the processing speed.

Meanwhile, in the second embodiment, the transfer of the frame data from the data manager 200 to the lower-level processor 300 as well as the transfer of the scores from the data manager 200 to the upper-level processor 100 is performed according to the push method. However, alternatively, only either the frame data or the scores can be transferred according to the push method.

Third Embodiment

Given below is the explanation of a third embodiment. In the third embodiment, the explanation is given for an exemplary configuration of a data processing device that includes a plurality of upper-level processors 100, a plurality of data managers 200, and a plurality of lower-level processors 300. The upper-level processors 100, the data managers 200, and the lower-level processors 300 have identical internal configurations to the configuration of the data processing device according to the first embodiment (see FIG. 1). Moreover, the fundamental operations of the data processing device are identical to the first embodiment or the second embodiment. The following explanation is given only about the differences with the first and second embodiments.

Figure 7:
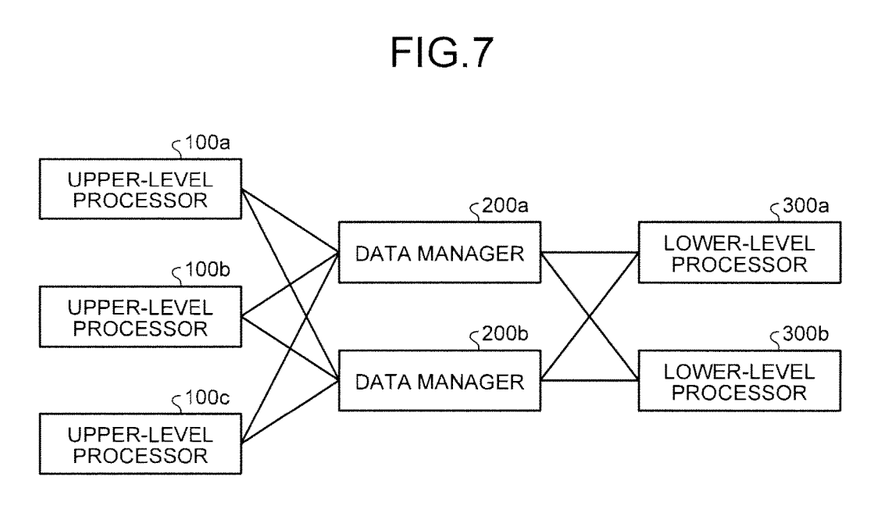
FIG. 7 is a block diagram illustrating an exemplary overall configuration of a data processing device according to a third embodiment.

FIG. 7 is a block diagram illustrating an exemplary overall configuration of the data processing device according to the third embodiment. As illustrated in FIG. 7, the data processing device according to the third embodiment includes upper-level processors 100a, 100b, and 100c (in the case of referring them collectively, written as the upper-level processor 100); data managers 200a and 200b (in the case of referring them collectively, written as the data manager 200); and lower-level processors 300a and 300b (in the case of referring them collectively, written as the lower-level processor 300). It is assumed that the upper-level processors 100a, 100b, and 100c and the data managers 200a and 200b are connected by a communication line such as a LAN or the Internet; and the data managers 200a and 200b and the lower-level processors 300a and 300b are connected by a communication line such as a LAN or the Internet. The transfer of frame data from the data managers 200a and 200b to the lower-level processors 300a and 300b as well as the transfer of scores from the data managers 200a and 200b to the upper-level processors 100a, 100b, and 100c can be performed either according to the pull method explained in the first embodiment or according to the push method explained in the second embodiment. In the configuration example illustrated in FIG. 7, there are three upper-level processors 100, two data managers 200, and two lower-level processors 300. However, the number of upper-level processors 100, the number of data managers 200, and the number of lower-level processors 300 can be set arbitrarily, and the numbers are not limited to the configuration illustrated in FIG. 7.

In the third embodiment, specification information that specifies the lower-level processor 300 for processing the concerned frame data from among the lower-level processors 300a and 300b can be attached to the frame data sent from the upper-level processor 100 to the data manager 200. Thus, when specification information is attached to the frame data sent to the data manager 200 by the upper-level processor 100, the data manager 200 sends that frame data to the lower-level processor 300 that is specified in the specification information.

When the transfer of frame data from the data manager 200 to the lower-level processor 300 is performed according to the pull method, regarding a piece of frame data having the specification information attached thereto from among the pieces of frame data stored in the data storage 201, even if a data referral request is received from the lower-level processor 300 other than the lower-level processor 300 specified in the specification information, the data manager 200 does not send that frame data to the other lower-level processor 300. When the transfer of frame data from the data manager 200 to the lower-level processor 300 is performed according to the push method, regarding a piece of frame data having the specification information attached thereto from among the pieces of frame data stored in the data storage 201, the data manager 200 sends that frame data only to the lower-level processor 300 which is specified in the specification information. Then, each lower-level processor 300 performs score calculation on the frame data in which that particular lower-level processor 300 is specified in the specification information. As a result, regarding the frame data for which score calculation requires a high computing performance, the lower-level processor 300 having the required specifications can be assigned to process the frame data. That enables achieving efficiency in the processing.

Moreover, in the third embodiment, from among the upper-level processors 100a, 100b, and 100c; any upper-level processor 100 other than the upper-level processor 100 that attached the order information to frame data and sent the frame data to the data manager 200 can integrate the scores received from the data manager 200 and generate the voice recognition result. That is, since the order of the frames in the voice data is secured in the order information, any upper-level processor 100 other than the upper-level processor 100 that receives input of the voice data can generate and output the voice recognition result with respect to the voice data. As a result, the upper-level processor 100 having a particularly high capacity or not performing processing can be given priority to generate the voice recognition result, thereby enabling achieving enhancement in the overall processing speed of the task.

Fourth Embodiment

Figure 8:
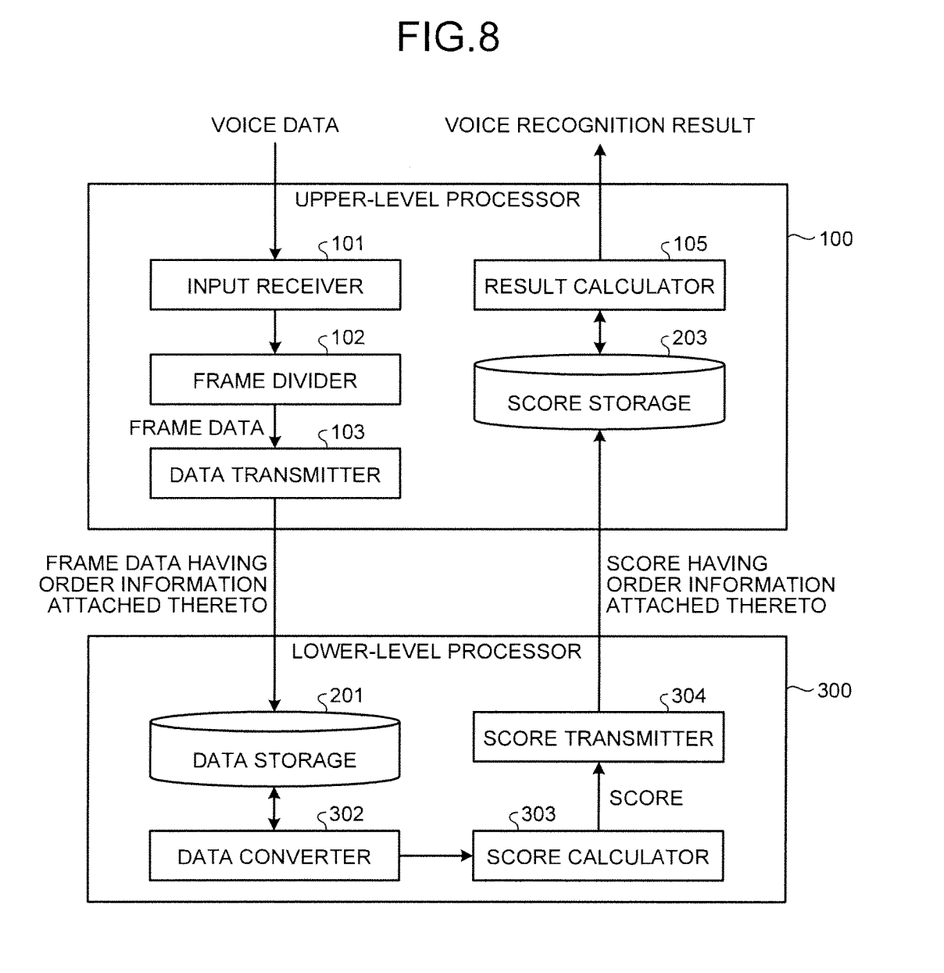
FIG. 8 is a block diagram illustrating an exemplary configuration of a data processing device according to a fourth embodiment.

Given below is the explanation of a fourth embodiment. In the fourth embodiment, the explanation is given for an exemplary configuration of a data processing device in which the data storage 201 is disposed in the lower-level processor 300, and the score storage 203 is disposed in the upper-level processor 100, so that the data manager 200 becomes redundant.

FIG. 8 is a block diagram illustrating an exemplary configuration of the data processing device according to the fourth embodiment. As illustrated in FIG. 8, in the data processing device according to the fourth embodiment, as compared to the configuration of the data processing device according to the first embodiment, the data storage 201 is disposed in place of the data receiver 301 in the lower-level processor 300. Moreover, the score storage 203 is disposed in place of the score receiver 104 of the upper-level processor 100.

In the data processing device according to the fourth embodiment, the data transmitter 103 of the upper-level processor 100 sends frame data having the order information attached thereto to the lower-level processor 300. The frame data sent to the lower-level processor 300 is stored in the data storage 201 that is disposed in the lower-level processor 300. Then, in the lower-level processor 300, the frame data stored in the data storage 201 is read, for example, according to the order specified in the order information; and data conversion and score calculation is performed. Subsequently, the score transmitter 304 of the lower-level processor 300 sends the scores having the order information attached thereto to the upper-level processor 100. The scores sent to the upper-level processor 100 are stored in the score storage 203 that is disposed in the upper-level processor 100. Then, in the upper-level processor 100, the scores stored in the score storage 203 are read according to the order specified in the order information and are integrated so that the voice recognition result is generated.

As described above, in the data processing device according to the fourth embodiment, since the data manager 200 is not required, the configuration becomes simpler as compared to the first and second embodiments.

Supplementary Explanation

Each of the upper-level processor 100, the data manager 200, and the lower-level processor 300 in the data processing device according to the embodiments can be implemented by executing a predetermined computer program (software) in a general-purpose computer system representing the basic hardware. At that time, for example, the computer programs are recorded in a recording medium such as a magnetic disk (a flexible disk or a hard disk), an optical disk (a CD-ROM, a CD-R, a CD-RW, a DVD-ROM, a DVD±R, a DVD±RW, or a Blu-ray (registered trademark) disc), a semiconductor memory, or a similar type of recording medium. As long as the recording medium used to record the computer programs is readable in the computer system, the memory format is no object. Alternatively, the computer programs can be installed in advance in the computer system, or can be distributed via a network for installation in the computer system.

The computer programs executed in the computer system contain modules for the functional constituent elements of the upper-level processor 100, the data manager 200, and the lower-level processor 300 constituting the data processing device according to the embodiments. A processor reads the computer programs and executes them so that the computer programs are loaded in main memory and the functional constituent elements of the upper-level processor 100, the data manager 200, and the lower-level processor 300 are generated in the main memory.

Meanwhile, the functional constituent elements of the upper-level processor 100, the data manager 200, and the lower-level processor 300 need not be implemented using computer programs (software) only; and some or all of the functional constituent elements can be implemented using dedicated hardware such as an application specific integrated circuit (ASIC) or a field-programmable gate array.

Meanwhile, in the first to fourth embodiments, the explanation is given for a voice recognition device (a voice recognition system) in which voice data is input as series data, and a voice recognition result with respect to the voice data is output as result data. However, the data processing device according to the embodiment can be widely implemented in a device (a system), such as a character recognition device or a gesture recognition device, in which series data is processed for purposes other than a voice recognition operation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data processing device that generates result data which represents a result of performing predetermined processing on series data, the device comprising:
   a memory; and
   one or more hardware processors configured to function as a plurality of upper-level processors and a lower-level processor, wherein
   the upper-level processors attach order information to data blocks;
   the lower-level processor performs lower-level processing on the data blocks having the order information attached thereto, and attaches common order information, which is in common with the data blocks, to values obtained as a result of the lower-level processing; and
   a second upper-level processor other than a first upper-level processor that has attached the order information to the data blocks, integrates the values, which have the common order information attached thereto, based on the common order information, and performs upper-level processing to generate the result data, wherein the data blocks constitute an utterance section between non-utterance sections.

2. The device according to claim 1, wherein
   the data blocks represent processing units in the lower-level processor, and
   the order information indicates an order of data blocks in the series data.

3. The device according to claim 1, wherein
   the upper-level processors store the data blocks, which have the order information attached thereto, in first storage of the memory,
   the lower-level processor performs the lower-level processing with respect to the data blocks stored in the first storage, and stores the values, which have the common order information attached thereto, in second storage of the memory, and the upper-level processors integrate the values, which are stored in the second storage, based on the common order information and perform the upper-level processing.

4. The device according to claim 1, wherein the upper-level processors
receive the series data not divided into the data blocks, divide the received series data into the data blocks, and attach the order information to the data blocks.

5. The device according to claim 1, wherein
the upper-level processors further attach priority information indicating priority of the data blocks, and
the lower-level processor performs the lower-level processing on a priority basis on the data block, from among the data blocks having the order information and the priority information attached thereto, for which the priority information indicates high priority.

6. The device according to claim 1, wherein
the one or more processors are configured to further comprise a plurality of the lower-level processors,
the upper-level processors further attach specification information indicating the lower-level processor to be assigned for performing the lower-level processing on the data blocks, and
each of the plurality of lower-level processors performs the lower-level processing on the data blocks attached with the specification information that specifies the lower-level processor.

7. The device according to claim 3, wherein
the first storage is disposed in the lower-level processor, and
the second storage is disposed in the upper-level processors.

8. The device according to claim 1, wherein
the series data represents voice data,
the predetermined processing represents a voice recognition,
the lower-level processing represents a score calculation for calculating frame-by-frame scores in the voice data, and
the upper-level processing represents a decoding for calculating a result of a voice recognition performed on the voice data based on the scores.

9. The device according to claim 1, wherein
the lower-level processor performs the lower-level processing using a first computing resource,
the upper-level processors perform the upper-level processing using a second computing resource, and
the first computing resource has a greater calculation speed than the second computing resource, while the second computing resource has a greater memory capacity than the first computing resource.

10. A data processing method implemented in a data processing device that generates result data representing a result of performing predetermined processing on series data and that comprises one or more hardware processors configured to function as a plurality of upper-level processors and a lower level processor, the method comprising:
attaching by the upper-level processors, order information to data blocks;
performing, by the lower-level processor, lower-level processing on the data blocks having the order information attached thereto;
attaching, by the lower-level processor, common order information, which is in common with the data blocks, to values obtained as a result of the lower-level processing; and
integrating a second upper-level processor other than a first upper-level processor that has attached the order information to the data blocks, the values, which have the common order information attached thereto, based on the common order information and performing upper-level processing to generate the result data, wherein the data blocks constitute an utterance section between non-utterance sections.

11. A computer program product comprising a non-transitory computer readable medium including programmed instructions, wherein the programmed instructions, when executed by a data processing device that generates result data representing a result of performing a predetermined processing on series data, cause the data processing device to function as:
a plurality of upper-level processors configured to attach order information to data blocks; and
a lower-level processor configured to perform lower-level processing on the data blocks having the order information attached thereto, and attach common order information, which is in common with the data blocks, to values obtained as a result of the lower-level processing, wherein
a second upper-level processor other than a first upper-level processor that has attached the order information to the data blocks, integrates the values, which have the common order information attached thereto, based on the common order information, and performs upper-level processing to generate the result data, wherein the data blocks constitute an utterance section between non-utterance sections.

* * * * *